United States Patent [19]

Lorenzetti et al.

[11] Patent Number: 5,658,674
[45] Date of Patent: Aug. 19, 1997

[54] CVE SILICONE ELASTOMER COMPOSITIONS AND PROTECTIVE COATING OF VEHICULAR AIRBAGS THEREWITH

[75] Inventors: Dominique Lorenzetti, Caluire; Pierre-Michel Peccoux, Lyons, both of France

[73] Assignee: Rhone-Poulenc Chimie, Courbevoie Cedex, France

[21] Appl. No.: 434,190

[22] Filed: May 3, 1995

[30] Foreign Application Priority Data

May 3, 1994 [FR] France .................... 94 05652

[51] Int. Cl.⁶ ............................ B32B 27/06
[52] U.S. Cl. ............... 428/447; 525/478; 528/15; 528/31; 524/862; 524/783; 524/785; 524/779; 524/780; 428/423.5; 428/423.7; 442/136
[58] Field of Search .................. 525/478; 528/15, 528/31, 32; 524/862, 783, 780, 779, 785; 428/447

[56] References Cited

U.S. PATENT DOCUMENTS

| | | | |
|---|---|---|---|
| 5,283,307 | 2/1994 | Larson | 528/15 |
| 5,296,298 | 3/1994 | Fujimoto et al. | 428/447 |
| 5,298,317 | 3/1994 | Takahashi et al. | 428/266 |
| 5,326,844 | 7/1994 | Fujiki et al. | 528/15 |
| 5,364,921 | 11/1994 | Gray et al. | 528/15 |
| 5,399,402 | 3/1995 | Inoue et al. | 428/53.7 |
| 5,399,651 | 3/1995 | Gentle et al. | 528/15 |

FOREIGN PATENT DOCUMENTS

| | | |
|---|---|---|
| 0326712 | 8/1989 | European Pat. Off. |
| 553840 | 8/1993 | European Pat. Off. |
| 0 533 840 A1 | 8/1993 | European Pat. Off. |
| 0553840 | 8/1993 | European Pat. Off. |
| 0576984 | 1/1994 | European Pat. Off. |
| 576984 | 1/1994 | European Pat. Off. |

*Primary Examiner*—Margaret W. Glass
*Attorney, Agent, or Firm*—Burns, Doane, Swecker & Mathis, L.L.P.

[57] ABSTRACT

CVE polyorganosiloxane compositions crosslinkable into silicone elastomeric state, well suited for the protective coating of a wide variety of substrates and supports, notably vehicular airbags, are improvedly adhered thereto by including in said CVE silicone compositions an adhesiveness promoter comprising (1) at least one alkoxylated organosilane containing, per molecule, at least one $C_2$–$C_6$ alkenyl radical, (2) at least one organosilicon compound containing at least one epoxy radical, and (3) at least one chelate of metal M and/or a metal alkoxide having the formula: $M(OJ)_n$, wherein n is the valency of M, J is a linear or branched $C_1$–$C_8$ alkyl radical, and M is selected from among Ti, Zr, Ge, Li, Mn, Fe, Al and Mg.

17 Claims, No Drawings

CVE SILICONE ELASTOMER COMPOSITIONS AND PROTECTIVE COATING OF VEHICULAR AIRBAGS THEREWITH

BACKGROUND OF THE INVENTION

1. Technical Field of the Invention

The present invention relates to improved cold-vulcanizable silicone elastomer compositions, in particular those of the two-component type (CVE II) that are crosslinked via hydrosilylation or polyaddition. These crosslinked compositions are well suited, inter alia, as protective coatings, for example for the mechanical protection or reinforcement of various fibrous substrates or supports, whether woven or otherwise, notably vehicular airbags.

2. Description of the Prior Art

It is generally known to this art to provide silicone coatings by coating the support (or substrate) with appropriate composition and then curing same by the polyaddition of the unsaturated groups (alkenyl, e.g. Si-Vi) of a polyorganosiloxane to hydrogen atoms of the same or of a different polyorganosiloxane.

These silicone elastomer compositions have become increasingly important for the protective coating of flexible materials, woven or otherwise, employed for the manufacture of bags for individual protection of a vehicle occupant, usually referred to as airbags.

These individual protection bags or airbags are more especially described, for example, in French Patent 2,668,106.

Traditionally, airbags are fabricated from a cloth of synthetic fibers, for example of polyamide (e.g., nylon), covered or coated on at least one of its face surfaces with a layer of an elastomer of the chloroprene type. The presence of such a layer or of such a protective coating is dictated by the fact that the gases released by the gas generator (carbon monoxide) in the case of impact are extremely hot and contain incandescent particles capable of damaging the nylon bag. The internal elastomeric protective layer must therefore be particularly resistant to high temperature and to mechanical stresses. It is also important that this elastomer coating should be in the form of a uniform thin film which is completely adherent to the synthetic fabric support defining the walls of the airbag.

Another disadvantage presented by the known elastomer coatings is that of limited resistance to aging, i.e., of the preservation of the thermal, mechanical and adhesion properties over time. This disadvantage is all the more acute since the individual protection bags are stored in folded form in motor vehicles before their possible saving expansion in the event of accident.

Lastly, the protective coating must not present problems with regard to the manufacture of the airbags by sewing.

The silicone elastomer compositions have now quickly replaced the chloroprenes for this application because it has been found that the chloroprenes do not satisfactorily meet all of the aforesaid specifications and criteria and, in addition, have the defect of being too heavy, which delays the expansion of the inflatable bag.

Thus, published European Patent Application No. 553,840 describes liquid silicone elastomer coating compositions for application to the inflatable airbag for the protection of individuals in motor vehicles, comprising:

(A) a polydiorganosiloxane having at least two alkenyl radicals per molecule, (B) a polyorganosiloxane resin, (C) an inorganic filler material, (D) a polyorganohydrosiloxane having at least two silicon atoms bonded to hydrogen in each molecule, (E) a metal curing catalyst of the platinum group, (F) an organosilicon compound containing an epoxy group, and (G) optionally, a compound selected from among alcohols of alkyne type, which serve as an inhibitor of crosslinking.

These known silicone elastomer compositions suffer especially from the serious disadvantage of not adhering sufficiently and effectively to the polyamide fabric of the airbag in order to guarantee an optimum reliability which is plainly very important where road safety is concerned.

SUMMARY OF THE INVENTION

Accordingly, a major object of the present invention is the provision of improved CVE silicone elastomer compositions well suited for the protective coating of a wide variety of substrates and supports, especially for the protective coating of inflatable safety bags for motor vehicles, and exhibiting optimum properties in respect of (a) fire and temperature resistance, (b) mechanical properties, (C) aging behavior, (d) adhesiveness, (e) thinness, (f) surface uniformity, and (g) lightness.

Another object of the present invention is the provision of silicone elastomer compositions (CVE II) for an airbag, which are easy to process and to apply and which are also economical.

Yet another object of this invention is the provision of a technique for coating a fibrous support fabric, woven or otherwise, for an inflatable safety bag, which offers all of the quality guarantees which are indispensable where safety is concerned.

Briefly, the present invention features novel cold-vulcanizable silicone elastomer coating compositions (CVE), comprising intimate admixture of:

(I) at least one polyorganosiloxane containing, per molecule, at least two $C_2$–$C_6$ alkenyl radicals bonded to a silicon atom, (II) at least one polyorganosiloxane containing, per molecule, at least three hydrogen atoms bonded to a silicon atom, (III) a catalytically effective amount of at least one curing catalyst which comprises at least one metal belonging to the platinum group, (IV) an adhesiveness promoter, (V) optionally, an inorganic filler material, (VI) optionally, at least one inhibitor of crosslinking, and (VII) optionally, at least one polyorganosiloxane resin, said adhesiveness promoter comprising (IV.1) at least one alkoxylated organosilane containing, per molecule, at least one $C_2$–$C_6$ alkenyl radical, (IV.2) at least one organosilicon compound containing at least one epoxy radical, and (IV.3) at least one chelate of a metal M and/or a metal alkoxide having the formula: $M(OJ)_n$, wherein n is the valency of M, J is a linear or branched $C_1$–$C_8$ alkyl radical, and M is selected from among Ti, Zr, Ge, Li, Mn, Fe, Al and Mg.

DETAILED DESCRIPTION OF BEST MODE AND PREFERRED EMBODIMENTS OF THE INVENTION

More particularly according to the present invention, it has now unexpectedly and surprisingly been found that an adhesiveness or adhesion promoter based on the combination of three particular constituents provides exceptionally high performance levels in bonding to and with the support to be coated.

Since the prior art describes the use of only one epoxy functional compound as an adhesiveness promoter, it was completely unforeseen that combination of such a compound with the alkoxylated organosilane (IV.1) and the chelate (or the alkoxide) (IV.3) according to the invention would ultimately result in such a marked improvement in the adhesiveness properties. This is all the more surprising since this improvement is not attained to the detriment of the other properties of hardness, of mechanical strength, of surface uniformity and of heat resistance of the elastomer silicone coating of the CVE II type.

In a preferred embodiment of the invention, the alkoxylated organosilane (IV.1) of the promoter (IV) is more particularly selected from among compounds of the following general formula:

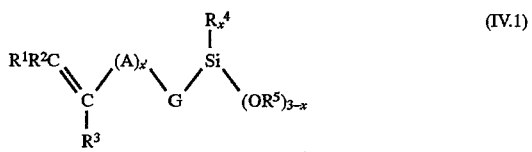
(IV.1)

in which $R^1$, $R^2$ and $R^3$, which may be identical or different, are each a hydrogen atom or hydrocarbon radical and are preferably hydrogen, a linear or branched $C_1$–$C_4$ alkyl radical or a phenyl radical optionally substituted by at least one $C_1$–$C_3$ alkyl radical, A is a linear or branched $C_1$–$C_4$ alkylene radical, G is a simple valence bond or oxygen, $R_4$ and $R^5$, which may be identical or different, are each a linear or branched $C_1$–$C_4$ alkyl radical, x'=0 or 1, and x=0 to 2, preferably 0 or 1 and even more preferably 0.

Vinyltrimethoxysilane is a preferred compound of formula (IV.1).

The organosilicon compound (IV.2) is advantageously selected either from among the compounds (IV.2a) having the following formula:

(IV.2a)

in which $R^6$ is a linear or branched $C_1$–$C_4$ alkyl radical, $R^7$ is a linear or branched alkyl radical, y is equal to 0, 1, 2 or 3, preferably to 0 or 1 and, even more preferably, to 0, X is a radical:

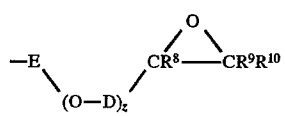

wherein E and D, which may be identical or different, are each a linear or branched $C_1$–$C_4$ alkyl radical, z is equal to 0 or 1, $R^8$, $R^9$ and $R^{10}$, which may be identical or different, are each a hydrogen atom or a linear or branched $C_1$–$C_4$ alkyl radical, with hydrogen being more particularly preferred, with the proviso that $R^8$ and $R^9$ or $R^{10}$ may together form, with the two carbons bearing the epoxy group, a 5- to 7-membered cycloalkyl ring; or from among the compounds (IV.2b) which are epoxyfunctional polydiorganosiloxanes comprising at least one structural unit of formula:

(IV.2b$_1$)

in which X is a radical as defined above in respect of formula (IV.2a), G is a monovalent hydrocarbon radical that does not adversely affect the activity of the catalyst and is preferably selected from among alkyl radicals having from 1 to 8 carbon atoms, optionally substituted by at least one halogen atom, advantageously from methyl, ethyl, propyl and 3,3, 3-trifluoropropyl radicals, and from aryl radicals and, advantageously, from xylyl, tolyl and phenyl radicals, p is 1 or 2, q is 0, 1, or 2, and p+q=1, 2 or 3, and further wherein, optionally, at least a proportion of the other structural units of these polydiorganosiloxanes are structural units having the average formula:

(IV.2b$_2$)

in which G is as defined above and r has a value ranging from 0 to 3, for example from 1 to 3.

The compounds (IV.2) are therefore preferably epoxyalkoxysilicon compounds and even more preferably the epoxyalkoxymonosilanes (IV.2a).

Exemplary compounds (IV.2) include 3-glycidoxypropyltrimethoxysilane (GLYMO), 3,4-epoxycyclohexylethyltrimethoxysilane, and the like.

With respect to the third required compound (IV.3) of the adhesiveness promoter (IV) of the silicone elastomer (CVE II) according to the invention, the preferred compounds are those in which the metal M is selected from among Ti, Zr, Ge, Li and Mn. Titanium is the more particularly preferred. With it may be associated, for example, a butyl radical.

A preferred adhesiveness promoter according to the invention comprises vinyltrimethoxysilane (VTMS)/3-glycidoxypropyltrimethoxysilane (GLYMO)/butyl titanate.

The weight proportions of the constituents (IV.1), (IV.2) and (IV.3), expressed as percentages by weight relative to the total weight thereof, are advantageously the following:

(IV.1) $\geq$10%, preferably ranging from 15% to 70% and even more preferably from 25% to 65%, (IV.2) $\leq$90%, preferably ranging from 70% to 15% and even more preferably from 65% to 25%, (IV.3) $\geq$1%, preferably ranging from 5% to 25% and even more preferably from 8% to 18%, with the understanding that the sum of these proportions of (IV.1), (IV.2) and (IV.3) is equal to 100%.

Interestingly, a correlation has been detected, on the one hand, between the adhesiveness performance levels and the structure of the silicone elastomer coating and, on the other, the weight ratio (IV.2):(IV.1). Thus, this ratio preferably ranges from 2:1 to 0.5:1; the ratio 2:1 is more particularly preferred.

The adhesiveness promoter is advantageously present in a proportion of 0.1% to 10%, preferably 0.5% to 5% and even more preferably 1% to 2.5% by weight relative to the total weight of the constituents of the composition.

In another embodiment of the present invention, the subject silicone compositions additionally comprise at least one polyorganosiloxane resin (VII) containing at least two alkenyl, preferably vinyl radicals. The resin (VII) advantageously has the following formula: MM (Vi) D (Vi) DQ. This compound (VII) serves the function of increasing the mechanical strength of the silicone elastomer coating, as well as its adhesiveness in respect of the coating of the face surfaces of a synthetic fabric (for example made of polyamide) sewn to form airbags. This structuring resin is advantageously present in the concentration ranging from 10% to 50% by weight relative to the total weight of the constituents of the composition, preferably from 20% to 40% by weight and, even more preferably from 25% to 35% by weight.

In terms of weight, the polyorganosiloxane (I) is one of the primary constituents of the compositions according to the invention. It is advantageously a polymer comprising recurring structural units of formula:

$$T_a Z_b SiO_{\frac{4-(a+b)}{2}} \quad (I.1)$$

in which T is an alkenyl radical, preferably a vinyl or allyl radical, Z is a monovalent hydrocarbon radical that does not adversely affect the activity of the catalyst and preferably is an alkyl radical having from 1 to 8 carbon atoms, optionally substituted by at least one halogen atom, advantageously a methyl, ethyl, propyl or 3,3,3-trifluoropropyl radical, or an aryl radical, advantageously a xylyl, tolyl or phenyl radical, a is 1 or 2, b is 0, 1, or 2, and a+b ranges from 1 to 3, and optionally, at least a proportion of the other structural units are structural units of the average formula:

$$Z_c SiO_{\frac{4-c}{2}} \quad (I.2)$$

in which Z is as defined above and c has a value ranging from 0 to 3, for example from 1 to 3.

It is advantageous that this polydiorganosiloxane have a viscosity of at least 10 mpa.s, preferably 1,000 mPa.s and even more preferably ranging from 5,000 to 200,000 mPa.s. Polydimethysiloxane is an exemplary compound (I).

All of the viscosities referred to herein correspond to a value of "Newtonian" dynamic viscosity at 25° C., namely, the dynamic viscosity which is measured, in a manner known per se, at a shear rate gradient sufficiently low for the measured viscosity to be independent of the rate gradient.

The polyorganosiloxane (I) may solely comprise structural units of formula (I.1) or may additionally comprise structural units of formula (I.2). Similarly, it may have a cyclic, branched, linear or network structure. Its degree of polymerization preferably ranges from 2 to 5,000.

Z is generally selected from among methyl, ethyl and phenyl radicals, at least 60 mol % of the radicals Z being methyl radicals.

Exemplary siloxy units of formula (I.1) include the vinyldimethylsiloxane structural unit, the vinylphenylmethylsiloxane structural unit and the vinylsiloxane structural unit.

Exemplary siloxy structural units of formula (I.2) include the $SiO_{4/2}$, dimethylsiloxane, methylphenylsiloxane, diphenylsiloxane, methylsiloxane and phenylsiloxane structural units.

Exemplary polyorganosiloxanes (I) include dimethylpolysiloxanes having dimethylvinylsilyl endgroups, methylvinyldimethylpolysiloxane copolymers having trimethylsilyl endgroups, methylvinyldimethyl-polysiloxane copolymers having dimethylvinylsilyl endgroups and cyclic methylvinylpolysiloxanes.

The polyorganosiloxane (II) preferably comprises siloxy structural units of the formula:

$$H_d L_e SiO_{\frac{4-(d+e)}{2}} \quad (II.1)$$

in which L is a monovalent hydrocarbon radical that does not adversely affect the activity of the catalyst and is preferably an alkyl radial having from 1 to 8 carbon atoms, optionally substituted by at least one halogen atom, and advantageously is a methyl, ethyl, propyl or 3,3,3-trifluoropropyl radical, or is an aryl radical, advantageously a xylyl, tolyl or phenyl radical, d is 1 or 2, e is 0, 1, or 2, and d+e has a value ranging from 1 to 3, and, optionally, at least a proportion of the other structural units are structural units of the average formula:

$$L_g SiO_{\frac{4-g}{2}} \quad (II.2)$$

in which L is as defined above and q has a value ranging from 0 to 3.

The dynamic viscosity $\eta_d$ of this polyorganosiloxane (II) $\geq 5$, preferably $\geq 10$ and, more preferably ranges from 20 to 1,000 mPa.s.

α,ω-Poly(dimethylsiloxane)(methylhydrosiloxy)-dimethylhydrosiloxane is an exemplary polyorganosiloxane (II).

The polyorganosiloxane (II) may solely comprise structural units of the formula (II.1) or may additionally comprise structural units of formula (II.2).

The polyorganosiloxane (II) may be cyclic, branched, linear or network in structure. Its degree of polymerization is greater than or equal to 2. More generally, it is less than 5,000.

The group L has the same definition as for the group Z above.

Exemplary recurring structural units of formula (II.1) include: $H(CH_3)_2SiO_{1/2}$, $HCH_3SiO_{2/2}$, $H(C_6H_5)SiO_{2/2}$.

Exemplary structural units of formula (II.2) are the same as those indicated above for the structural units of formula (I.2).

Exemplary polyorganosiloxane (II) include:

(a) dimethylpolysiloxanes having hydrodimethylsilyl endgroups, (b) copolymers comprising dimethylhydromethylpolysiloxane (dimethyl) recurring structural units and having trimethylsilyl endgroups, (c) copolymers comprising dimethylhydromethylpolysiloxane recurring structural units and having hydrodimethylsilyl endgroups, (d) hydromethylpolysiloxanes having trimethylsilyl endgroups, (e) cyclic hydromethylpolysiloxanes.

The ratio of the number of hydrogen atoms bonded to silicon in the polyorganosiloxane (I) to the number of olefinically unsaturated groups of the polyorganosiloxane (II) ranges from 0.4 to 10, preferably from 0.6 to 5.

The polyorganosiloxane (I) and/or the polyorganosiloxane (II) may be diluted in a nontoxic organic solvent compatible with the silicones.

The polyorganosiloxanes (I) and (II) as a class are typically designated "silicone resins."

The bases for the polyaddition silicone compositions may comprise only linear polyorgano-siloxanes (I) and (II) such as, for example, those described in U.S. Pat. Nos. 3,220,972, 3,697,473 and 4,340,709, or may at the same time comprise polyorganosiloxanes (I) and (II) which are branched or network polymers, such as, for example, those described in U.S. Pat. Nos. 3,284,406 and 3,434,366.

The catalysts (III) are also well known to this art. Platinum and rhodium compounds are preferably employed. In particular, the complexes of platinum and of an organic compound can be used that are described in U.S. Pat. Nos. 3,159,601, 3,159,602 and 3,220,972 and in EP-A-0,057,459, EP-A-0,188,978 and EP-0,190,530, as well as the complexes of platinum and of vinyl organosiloxanes described in U.S. Pat. Nos. 3,419,593, 3,715,334, 3,377,432 and 3,814, 730. Platinum is the catalyst generally preferred. In this event the amount by weight of catalyst (III), calculated as the weight of the platinum metal, generally ranges from 2 to 400 ppm, preferably from 5 to 200 ppm, based on the total weight of the polyorganosiloxanes (I) and (II).

The optional filler (V) is preferably inorganic. It either may or may not be a siliceous material.

With respect to the siliceous materials, these may serve as a reinforcing or semi-reinforcing filler.

The reinforcing siliceous fillers are advantageously selected from among colloidal silicas, pyrogenic and precipitation silica powders, or mixtures thereof.

These powders have a mean particle size which is generally less than 0.1 µm and a BET specific surface area greater than 50 m$^2$/g, preferably ranging from 150 to 350 m$^2$/g.

The semi-reinforcing siliceous fillers such as diatomaceous earths or ground quartz may also be used.

With respect to the nonsiliceous inorganic filler materials, these may serve as a semi-reinforcing or packing inorganic filler. Exemplary nonsiliceous fillers which can be employed, whether alone or in admixture, include carbon black, titanium dioxide, aluminum oxide, alumina hydrate, expanded vermiculite, unexpanded vermiculite, calcium carbonate, zinc oxide, mica, talc, iron oxide, barium sulfate and slaked lime. These fillers have a particle size which advantageously ranges from 0.001 to 300 µm and a BET surface less than 100 m$^2$/g.

As a practical matter, but without any limitation being implied, the filler employed is a mixture of quartz and silica.

The filler material may be treated with all or a fraction of at least one and/or other of the compounds (IV.1) to (IV.3) of the promoter (IV).

It is preferred to employ an amount of filler material ranging from 20% to 50%, preferably from 25% to 35% by weight relative to the total weight of the constituents of the composition.

The silicone elastomer composition advantageously includes at least one retardant (IV) of the addition reaction (inhibitor of crosslinking), selected from among the following compounds:

(i) polyorganosiloxanes, advantageously cyclic and substituted by at least one alkenyl radical; with tetramethylvinyltetrasiloxane being particularly preferred, (ii) pyridine, (iii) phosphines and organic phosphites, (iv) unsaturated amides, (v) alkyl maleates, and (iv) acetylenic alcohols.

These acetylenic alcohols (cf. FR-B-1,528,464 and FR-A-2,372,874), which constitute a part of the preferred thermal blockers of the hydrosilylation reaction, have the formula:

in which R is a linear or branched alkyl radical or a phenyl radical, R' is H or a linear or branched alkyl radical or a phenyl radical, with the proviso that the radicals R, R' and the carbon atom situated α– to the triple bond may together form a ring member, and the total number of carbon atoms in R and R' is at least 5, and preferably ranges from 9 to 20.

The aforesaid alcohols are preferably selected from among those which have a boiling point higher than 250° C. Exemplary thereof are:
1-ethynyl-1-cyclohexanol,
3-methyl-1-dodecyn-3-ol,
3,7,11-trimethyl-1-dodecyn-3-ol,
1,1-diphenyl-2-propyn-1-ol,
3-ethyl-6-ethyl-1-nonyn-3-ol,
3-methyl-1-pentadecyn-3-ol.

These α-acetylenic alcohols are commercially available compounds.

When used, the retardant (IV) is advantageously present in a proportion of at most 3,000 ppm, preferably in a proportion ranging from 100 to 2,000 ppm relative to the total weight of the polyorganosiloxanes (I) and (II).

Various conventional additives and adjuvants such as, for example, colorants, may be added to the silicone elastomer compositions as is, per se, known to this art.

The compositions of this invention advantageously have a dynamic viscosity ranging from 10,000 to 50,000, and preferably from 15,000 to 30,000 mPa.s.

In another embodiment, the present invention features 2-component precursors of the elastomeric silicone compositions described above. Such precursors comprise two distinct portions A and B which are ultimately mixed to formulate the composition, one of these portions A or B including the catalyst (III) and only one of the polyorganosiloxane species (I) or (II). Another characteristic of this precursor system is that its fraction A or B containing the polyorganosiloxane (II) is devoid of the compounds (IV.3) of the promoter (IV), and its fraction A or B including the compound (IV.1) of the promoter (IV) does not include the catalyst (III).

The composition may thus, for example, comprise a fraction A including the compounds (IV.1) and (IV.2), while fraction B contains the compound (IV.3).

To formulate the two-component silicone elastomer composition A-B, a primary paste is first prepared by mixing an inorganic filler, at least a proportion of the resin (VII) and at least a proportion of the polyorganosiloxane (I).

This paste serves as a base for providing, on the one hand, a portion A resulting from the mixture of the latter with the polyorganosiloxane (II), optionally an inhibitor of crosslinking and lastly the compounds (IV.1) and (IV.2) of the promoter (IV). Portion B is produced by mixing a part of the abovementioned paste and of the polyorganosiloxane (I), as well as a colorant base, catalyst (Pt) and the compounds (IV.3) of the promoter (IV).

The viscosity of the fractions A and B and of their mixtures can be adjusted by modifying the amounts of the constituents and by selecting polyorganosiloxanes of different viscosity.

Once mixed with each other, the fractions A and B constitute a silicone elastomer composition (CVE II) which is ready for use and can be applied onto the support by any suitable means of coating (for example a doctor blade or roll).

Crosslinking of the composition applied onto the support to be coated may be induced thermally and/or by electromagnetic radiation (UV).

The present invention thus also features the use of the elastomer compositions or its precursors described above for covering or coating a support which either may or may not be fibrous, preferably fibrous and even more preferably supports made of synthetic fibers, advantageously made of polyester or polyamide, or the like.

In this respect, this invention particularly features the covering or coating of at least one of the face surfaces of the flexible material (for example polyamide fabric) which can be used for the manufacture, by sewing, of inflatable airbags for the individual protection of a vehicle occupant in case of impact or collision.

Thus, the present invention also features an inflatable airbag comprising an envelope made of a flexible material, preferably of fabric (for example of nylon), coated on at least one of its face surfaces (generally an internal face surface) with a composition according to the invention.

The coating formed by the compositions of the invention, after crosslinking, ensures good protection of the walls of the bag against high temperature and incandescent particles generated while the bag is inflating. Furthermore, the film formed is uniform, fine, and has good mechanical and elastic properties which do not deteriorate in storage. Lastly, and most importantly, this film is completely adherent to the support (e.g., of polyamide) comprising the bag.

In order to further illustrate the present invention and the advantages thereof, the following specific examples are given, it being understood that same are intended only as illustrative and in nowise limitative.

In said examples to follow, the viscosity was measured using a Brookfield viscometer according to AFNOR standard NFT 76 106 of May '82.

EXAMPLES 1.1 Preparation of a Primary Paste:

The following constituents were introduced into a planetary mixer in the proportions indicated in Table I below:

(a) resin (VII) of structure MM (Vi) D (Vi) DQ containing approximately 0.6% by weight of vinyl radicals, (b) ground quartz (V) (marketed by SIFRACO), (c) α,ω-(dimethylvinylsiloxy)-polydimethylsiloxane oil (I) having a viscosity of 100,000 mPa.s, containing approximately 0.083 mol % of $(CH_3)_2(CH_2=CH)SiO_{1/2}$ groups, (d) α,ω-(dimethylvinylsiloxy)-polydimethylsiloxane oil (I) having a viscosity of 10,000 mPa.s, containing approximately 0.165 mol % of $(CH_3)_2(CH_2=CH)SiO_{1/2}$ groups, and the mixture was heated to 120° C. for approximately 2 hours.

After cooling, pyrogenic silica (V) treated with octamethylcyclotetrasiloxane was added.

1.2 Preparation of Fraction A of the Two-component Composition:

The following constituents were mixed in a reactor at ambient temperature, in the proportions indicated in Table I (except for (IV);cf. Table II) below:

(a') the above paste, (b') α,ω-poly(dimethylsiloxy)(methylhydrosiloxy) dimethylhydrosiloxy oil (II) having a viscosity of 300 mPa.s and containing 0.17 mol % of H groups, (c') ethynylcyclohexanol (IV), (d') the adhesiveness promoters (IV.1) and (IV. 2).

1.3 Preparation of Fraction B of the Two-component Composition:

The following constituents were mixed in a reactor at ambient temperature, in the proportions indicated in Table II (except for (IV);cf. Table II) below:

(a") the above paste, (b") α,ω-(dimethylvinylsiloxy)polydimethyl-siloxane oil (I) having a viscosity of 100,000 mPa.s, containing 0.083 mol % of $(CH_3)_2(CH_2=CH)SiO_{1/2}$ groups, (c") the colorant base, (d") Pt metal catalyst of crosslinking (III), introduced in the form of an organometallic complex, (e") the adhesiveness promoters (IV.3).

1.4 Preparation of the Two-component Composition:

The two-component composition was formulated by mixing, at ambient temperature, 100 parts by weight of the fraction A and 10 parts by weight of the fraction B.

1.5 Coating Technique:

The above mixture was coated using doctor blades or rolls onto polyhexamethylene adipamide fabric (nylon 66) and in a weight per unit area=160 g/m$^2$ and was then crosslinked for 4 minutes at 150° C. in a Matthis oven.

1.6 Results Obtained:

Table II below reports, on the one hand, the experimental data from 8 tests 1 to 8 and, on the other, the corresponding properties for two batches of composition deposited.

The crumpling test (NFG standard 37 110) reflects the adhesiveness and the aging behavior of the composition. This test entailed subjecting the fabric, on the one hand, to a shearing motion by means of two jaws gripping the two opposite edges of a test piece and driven with an alternating movement relative to one another, and, on the other, to abrasion by contact with a movable support.

Tests 1 to 4 were negative controls, or comparative examples, in which the adhesiveness promoter included only one or two of the constituents (IV.1) to (IV.3).

Tests 5 to 8 reflect different proportions of the three constituents (IV.1) to (IV.3) of the promoter (IV) according to the invention.

TABLE I

| PASTE (parts by weight) | |
|---|---|
| Resin (VII) | 350.00 |
| SIFRACO C 600 Ground Quartz | 290.00 |
| High Viscosity Oil (I) = 100,000 mPa · s | 232.00 |
| Low Viscosity Oil (I) = 10,000 mPa · s | 118.00 |
| AE 60 Silica | 10.00 |

| Fractions A and B formulations (parts by weight) | part A | part B |
|---|---|---|
| Paste | 100 | 9.40 |
| Oil (II) | 4.25 | — |
| Ethynylcyclohexanol | 0.03 | — |
| High Viscosity Oil (I) = 100,000 mPa · s | — | 0.80 |
| Colorant base based on Cromophthal 4 GNP Blue marketed by CIBA GEIGY | — | 0.11 |
| Catalyst (III) | — | 20 ppm Pt |
| Adhesiveness promoter IV | Cf. Table II | |

TABLE II

| TESTS | 1 | 2 | 3 | 4 | 5 | 6 | 7 | 8 |
|---|---|---|---|---|---|---|---|---|
| Fraction A: | | | | | | | | |
| TMVS (% by weight) (IV.1) | 1 | 0 | 0 | 0.5 | 0.5 | 1 | 0.5 | 1 |

TABLE II-continued

| | | | | | | | | |
|---|---|---|---|---|---|---|---|---|
| GLYMO (% by weight) (IV.2) | 1 | 1 | 1 | 1 | 0.5 | 0.5 | 1 | 1 |
| Fraction B: | B1 | | | | B2 | B3 | B4 | B5 |
| Ti(OBu)$_4$ (% by weight) (IV.3) | 0 | 0 | 4 | 0 | 1 | 2 | 2 | 4 |
| CORRESPONDING PROPERTIES | | | | | | | | |
| SHORE A hardness | 49 | — | — | — | 45 | 42 | 44 | 46 |
| weight deposited in g/m$^2$ | 50 | 88 | 97 | 67 | 43 | 41 | 41 | 40 |
| Crumpling test (cycles) (NFG standard 37 110) | adhering very weakly | — | — | — | 350 | 400 | 600 | 500 |
| weight deposited, g/m$^2$ | — | — | — | — | 57 | 65 | 57 | 60 |
| Crumpling test | — | adhering very weakly | adhering very weakly | adhering very weakly | 300 | 300 | 900 | 700 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A substrate comprising a fibrous support coated with a CVE silicone coating composition crosslinkable into elastomeric state, said coating composition comprising an intimate admixture of:

(I) at least one polyorganosiloxane having, per molecule, at least two $C_2$–$C_6$ alkenyl radicals bonded to a silicon atom, (II) at least one polyorganosiloxane having, per molecule, at least three hydrogen atoms bonded to a silicon atom, (III) a catalytically effective amount of at least one curing catalyst which comprises at least one platinum group metal, (IV) an adhesiveness promoter, (V) optionally, an inorganic filler material, (VI) optionally, at least one inhibitor of crosslinking, and (VII) optionally, at least one polyorganosiloxane resin, said adhesiveness promoter comprising (IV.1) at least one alkoxylated organosilane having the formula:

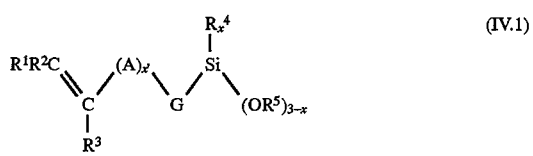

(IV.1)

in which $R^1$, $R^2$ and $R^3$, which are identical or different, are each a hydrogen atom or a hydrocarbon radical, A is a linear or branched $C_1$–$C_4$ alkylene radical, G is a simple valence bond or oxygen, $R^4$ and $R^5$, which are identical or different, are each a linear or branched $C_1$–$C_4$ alkyl radical, x'=0 or 1, and x=0 to 2, (IV.2) at least one organosilicon compound having at least one epoxy radical, and (IV.3) at least one chelate of a metal M and/or a metal alkoxide having the formula: $M(OJ)_n$, wherein n is the valency of M and J is a linear or branched $C_1$–$C_8$ alkyl radical, and M is Zr, Ge, Li, Mn, Fe or Mg.

2. The substrate as defined by claim 1, said organosilicon compound (IV.2) of promoter (IV) comprising a compound (IV.2a) having the formula:

(IV.2a)

in which $R^6$ is a linear or branched $C_1$–$C_4$ alkyl radical, $R^7$ is a linear or branched alkyl radical, y is equal to 0, 1, 2 or 3, X is a radical:

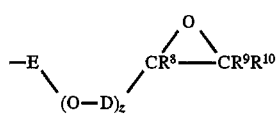

wherein E and D, which are identical or different, are each a linear or branched $C_1$–$C_4$ alkyl radical, z is equal to 0 or 1, and $R^8$, $R^9$ and $R^{10}$, which are identical or different, are each a hydrogen atom or a linear or branched $C_1$–$C_4$ alkyl radical, with the proviso that $R^8$ and $R^9$ or $R^{10}$ are optionally taken together to form, with the two carbon atoms bearing the epoxy group, a 5- to 7-membered cycloalkyl ring.

3. The substrate as defined by claim 1, said organosilicon compound (IV.2) comprising an epoxyfunctional polydiorganosiloxane having at least one recurring structural unit of the formula:

$$X_pG_qSiO_{\frac{4-(p+q)}{2}} \quad (IV.2b_1)$$

in which X is a radical:

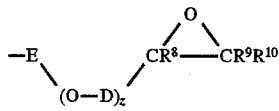

wherein E and D, which are identical or different, are each a linear or branched $C_1$–$C_4$ alkyl radical, z is equal to 0 or 1, and $R^8$, $R^9$ and $R^{10}$, which are identical or different, are each a hydrogen atom or a linear or branched $C_1$–$C_4$ alkyl radical, with the proviso that $R^8$ and $R^9$ or $R^{10}$ are optionally taken together to form, with the two carbon atoms bearing the epoxy group, a 5- to 7-membered cycloalkyl ring, G is a monovalent hydrocarbon radical that is inert with respect to the activity of the catalyst (III), P is 1 or 2, q is 0, 1, or 2, and p+q is 1, 2 or 3, with the proviso that, optionally, said polydiorganosiloxane also comprising recurring structural units of the average formula:

$$G_rSiO_{\frac{4-r}{2}} \quad (IV.2b_2)$$

in which G is as defined above and r ranges from 0 to 3.

4. The substrate as defined by claim 1, wherein the metal M of the chelate and/or alkoxide (IV.3) is Zr, Ge, Li or Mn.

5. The substrate as defined by claim 1, said adhesiveness promoter (IV) comprising vinyltrimethoxysilane (VTMS) (IV.1), 3-glycidoxypropyl-trimethoxysilane (GLYMO) (IV.2), and butyl titanate (IV.3).

6. The substrate as defined by claim 1, wherein the weight proportions of (IV.1), (IV.2) and (IV.3), expressed in % by weight relative to the total weight thereof, comprise from 15% to 70% of (IV.1), from 70% to 15% of (IV.2), and from 5% to 25% of (IV.3).

7. The substrate as defined by claim 6, wherein the weight ratio (IV.2):(IV.1) ranges from 2:1 to 0.5:1.

8. The substrate as defined by claim 1, said adhesiveness promoter (IV) is present in an amount from 0.1% to 10% by weight of the composition.

9. The substrate as defined by claim 1, said coating composition further comprising at least one polyorganosiloxane resin (VII) having at least two alkenyl radicals.

10. The substrate as defined by claim 1, said polyorganosiloxane (I) comprising recurring structural units of the formula:

$$T_aZ_bSiO_{\frac{4-(a+b)}{2}} \quad (I.1)$$

in which T is an alkenyl radical, Z is a monovalent hydrocarbon radical that is inert with respect to the activity of the catalyst (III), a is 1 or 2, b is 0, 1, or 2, and a+b ranges from 1 to 3, and, optionally, also comprising recurring structural units of the average formula:

$$Z_cSiO_{\frac{4-c}{2}} \quad (I.2)$$

in which Z is as defined above and c ranges from 0 to 3.

11. The substrate as defined by claim 1, said polyorganosiloxane (II) comprising recurring siloxy units of the formula:

$$H_dL_eSiO_{\frac{4-(d+e)}{2}} \quad (II.1)$$

in which L is a monovalent hydrocarbon radical that is inert with respect to the activity of the catalyst (III), d is 1 or 2, e is 0, 1, or 2, d+e ranges from 1 to 3, and, optionally, also comprising recurring structural units of the average formula:

$$L_gSiO_{\frac{4-g}{2}} \quad (II.2)$$

in which L is as defined above and q ranges from 0 to 3.

12. The substrate as defined by claim 1, wherein the proportions of (I) and of (II) are such that the molar ratio of the hydrogen atoms bonded to silicon in (II) to the alkenyl radicals bonded to silicon in (I) ranges from 0.4 to 10.

13. The substrate as defined by claim 1, said coating composition comprising two distinct fractions A and B, one of said fractions A and B including the catalyst (III) and a single species (I) or (II) of polyorganosiloxane, the fraction A or B including the polyorganosiloxane (II) being devoid of compound (IV.3) of the promoter (IV) and the fraction A or B including the compound (IV.1) of the promoter (IV) being devoid of the catalyst (III).

14. The substrate as defined by claim 1, in crosslinked elastomeric state.

15. A vehicular airbag comprising a flexible envelope, said flexible envelope comprising the substrate as defined by claim 14.

16. A vehicular airbag as defined by claim 15, comprising a flexible polyester or polyamide envelope.

17. A substrate comprising a fibrous support coated with a coating composition comprising an adhesiveness promoter composition, said adhesiveness promoter composition comprising (1) at least one alkoxylated organosilane the formula:

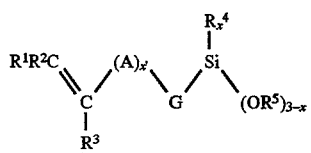

in which $R^1$, $R^2$ and $R^3$, which are identical or different, are each a hydrogen atom or a hydrocarbon radical, A is a linear or branched $C_1$–$C_4$ alkylene radical, G is a simple valence bond or oxygen, $R^4$ and $R^5$, which are identical or different, are each a linear or branched $C_1$–$C_4$ alkyl radical, x'=0 or 1, and x=0 to 2, (2) at least one organosilicon compound containing at least one epoxy radical, and (3) at least one chelate of metal M and/or a metal alkoxide having the formula: $M(OJ)_n$, wherein n is the valency of M, J is a linear or branched $C_1$–$C_8$ alkyl radical, and M is Zr, Ge, Li, Mn, Fe, or Mg.

* * * * *